United States Patent [19]
Williams

[11] 3,732,949
[45] May 15, 1973

[54] SPRING DRIVE APPARATUS AND METHOD

[76] Inventor: Clarence O. Williams, 204 Kirkwood Avenue, Rocky Mount, N.C. 27801

[22] Filed: June 22, 1971

[21] Appl. No.: 155,493

[52] U.S. Cl...............185/40 R, 185/DIG. 1, 60/7 A, 92/12, 46/206
[51] Int. Cl...............................................F03g 1/00
[58] Field of Search.................185/40 R, 40 A, 40 B, 185/40 H, DIG. 1; 60/7 A; 92/8, 11, 12; 46/206

[56] References Cited

UNITED STATES PATENTS

| 897,676 | 9/1908 | Thompson | 92/12 X |
| 1,560,439 | 11/1925 | Trenor | 92/12 X |
| 2,624,424 | 1/1953 | Kliewer | 185/40 R |

Primary Examiner—Edgar W. Geoghegan
Attorney—B. B. Olive

[57] ABSTRACT

A wound spiral spring employed as a mechanical power source includes a regulated fluid circulating means to control the energy released as the spring unwinds to drive a power consuming device such as a vehicle, lawn mower and the like.

3 Claims, 2 Drawing Figures

PATENTED MAY 15 1973

3,732,949

INVENTOR.
Clarence O. Williams

BY

B. B. Olive

ATTORNEY

SPRING DRIVE APPARATUS AND METHOD

BACKGROUND OF THE INVENTION

1. Field of the Invention

The invention relates to a spring motor and specifically to the power train apparatus and methods employed in controlling the rate of energy release from a wound spring to a spring driven device.

2. Description of the Prior Art

The prior art illustrates employment of a spring drive in a street car, U.S. Pat. No. 63,652; in a vehicle, U.S. Pat. No. 76,814; in a railroad handcar, U.S. Pat. No. 875,943 and in a general purpose motor, U.S. Pat. No. 1,075,023. However, even though such prior art dates back as early as 1867, there has been no general application of spring motors in vehicles, lawn mowers and the like. One major problem which has never been satisfactorily solved concerns a practical apparatus and method for controlling the spring energy release rate according to power demands. Various complex mechanical transmissions and the like have been proposed but none have achieved widespread use. In particular, it has never heretofore been proposed to employ a fluid circulating means, for example an oil pump or motor, in a spring motor power train and arranged so that the fluid circulating means circulates a predetermined quantity of fluid in a closed circuit which incorporates a means to control fluid flow which in turn controls the rate of release of spring energy.

SUMMARY OF THE INVENTION

According to the invention a spiral spring is wound by an external electric motor or other drive device. The wound spring is connected to a power train which includes a fluid circulating means adapted to circulate oil or other appropriate fluid through a closed circuit having an adjustable fluid flow control means, for example a valve. The rate at which the circulating means is allowed to operate is regulated by the rate at which the fluid flow control allows the fluid to circulate. Accordingly, the rate at which the power train is allowed to operate depends upon the rate of flow. That is, when the fluid flow is unrestricted, the spring energy is released at a maximum rate. On the other hand, when no fluid is allowed to flow, the spring is prevented from releasing any energy.

DESCRIPTION OF THE PREFERRED EMBODIMENTS

The drawings purposely show the invention in a schematic or generalized form to simplify the description. From this, those skilled in the art may proceed to any of the many detailed applications.

Figure 1:
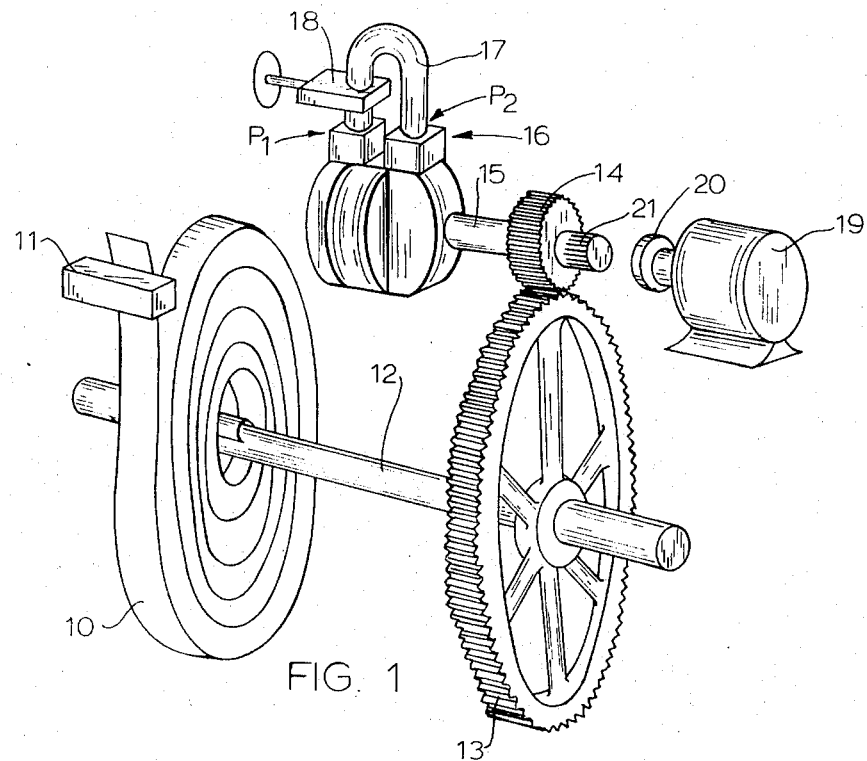
FIG. 1 is a perspective, somewhat schematic, view of a basic spring motor system according to the invention.

Referring to FIG. 1, the component parts consists basically of a spiral wound spring 10, having an outer end anchored to a fixed structure 11. An inner end is connected to shaft 12 which mounts gear 13 that is meshed to gear 14 to drive and increase the angular velocity of a shaft 15 over shaft 12. Shaft 15 is mounted to drive a fluid circulating means 16 such as a fluid pump or motor. The terms "pump" and "motor" taken in the context of the invention mean a device forming part of a closed fluid circuit and adapted when rotated to force fluid through the device and through the circuit in a continuous closed path. A "Hydreco Dual-Vane" pump made by General Signal Corporation, Kalamazoo, Mich., is an example. The inlet and outlet ports $P_1$, $P_2$ of pump 16 are connected as shown with a pipe loop 17 and in loop 17 is a suitable fluid flow control means illustrated by gate or needle valve 18.

To wind spring 10 there is provided an electric motor 19 having a coupling 20 adapted to slip onto spline 21 for driving shaft 12 to wind spring 10.

Operation of this invention is as follows: The electric motor 19 is coupled by means of coupling 20 to spline 21. Valve 18 is opened, which allows pump 16 to turn freely and circulate oil or other fluid through pipe 17. Motor 19 is energized and winds up spring 10 to maximum capacity and valve 18 is closed. At the same time, motor 19 is deenergized and coupling 20 is disconnected. Motion in the power train is thereby prevented until valve 18 is opened. Upon any opening of valve 18 pump 16 is released for rotation which of course allows spring 10 to unwind and drive shaft 12 at a rate determined by the amount by which valve 18 is open. With shaft 12 turning, either shaft 12 or shaft 15 may be used to drive any mechanism suited to the particular combination of torque and shaft rotation speed obtained as spring 10 unwinds.

Figure 2:
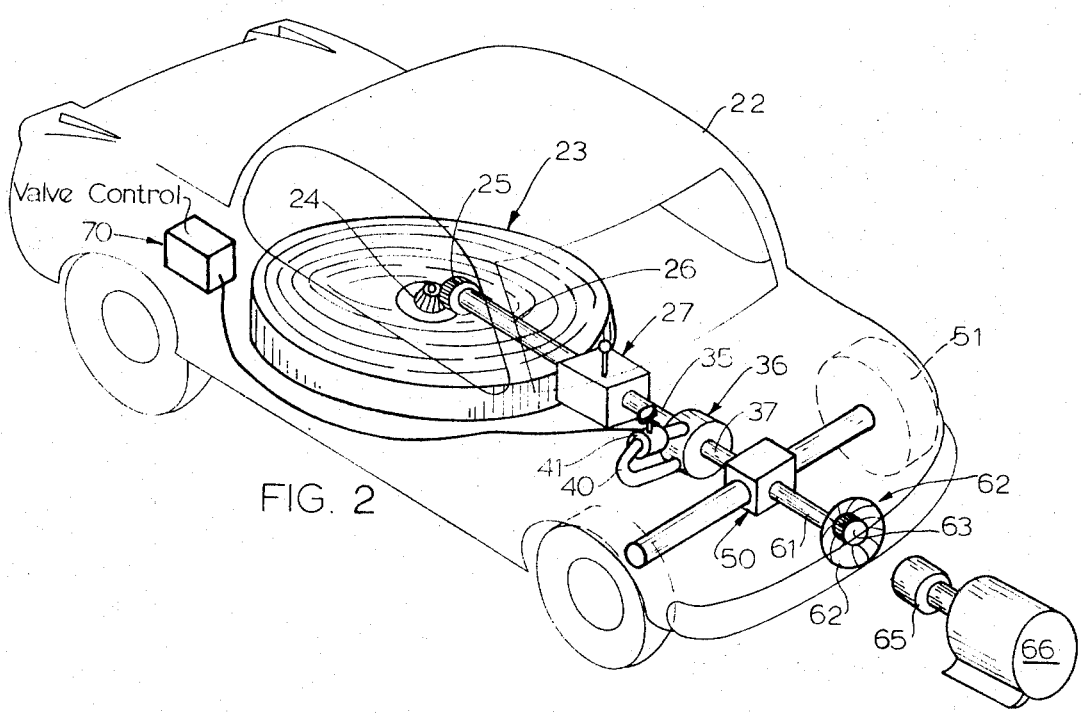
FIG. 2 is a somewhat schematic view of a vehicle with a spring motor system according to the invention.

Referring next to FIG. 2 a typical automobile body 22 is illustrated as having a power system according to the invention. Specifically, a spiral wound spring 23 is arranged to turn spiral gear 24 which engages a worm gear 25. Gear 25 is mounted on and drives a drive shaft 26. Drive shaft 26 is connected to drive an appropriate transmission 27 which may be mechanical, hydraulic or otherwise and adapted by those skilled in the art to be shifted while under torque. Transmission 27 in turn is connected through a shaft 35 to drive an oil pump 36 or other appropriate fluid circulating means having an output shaft 37. Turning of shaft 35 causes pump 36 to circulate fluid through a closed conduit 40 having a valve 41. Shaft 37 is connected to drive a conventional differential 50 and through such differential to drive wheels 51. Differential 50 is also suitably connected to a spring rewinding shaft 61 having a protective conical housing 62 and a spline 63 adapted to mate with a grooved chuck 65 driven by a suitable electric drive motor 66.

It will be understood that various controls, hand or foot of a conventional nature, while not shown, may be employed with transmission 27. Also, while not shown, it will be understood that appropriate foot, hand or other automatic controls may be employed with valve 41 to control its particular position, indicated at 70.

In rewinding the vehicle of FIG. 2 the gear train is mechanically arranged so as to allow shaft 61 to cause shaft 26 to rotate in a direction adapted to wind spring 23 to some predetermined capacity or torsion when valve 41 is open. By utilizing the power of electric motor 66 to drive shaft 61, spring 23 is now wound. At this time, valve 41 is closed which positively prevents spring 23 from releasing any energy. Upon the operator's desire to use the vehicle, valve 41 is opened by suitable controls and according to the amount of desired acceleration and velocity.

From the foregoing it can be seen that for vehicle and other applications there is provided a zero emission and noiseless power source with essentially minimum working parts and an assured long life of the basic power system with essentially no maintenance.

The power system, in respect to application, can be designed to suit particular power requirements and, at night for example, the system can be rewound to permit the release of energy during scheduled on duty hours.

Having described the invention, what is claimed is:

1. The method of winding and releasing energy in a spring driven motor system consisting of:
   a. securing one end of a spiral wound spring and connecting the other end to a rotatably mounted power shaft;
   b. connecting said power shaft to an external drive arrangement to turn such power shaft in a direction adapted to wind said spring in some predetermined amount.
   c. connecting said power shaft to a power train which includes a fluid pump having a pump shaft and a connected pipe loop adapted when the pump shaft is driven to circulate a predetermined amount of fluid in a closed fluid circuit which includes the pump, the pipe loop and a fluid flow control means acting as a valve; and
   d. allowing said spring to unwind and drive said fluid pump shaft as well as said power shaft and during the unwinding of said spring using said flow control means to control the rate of fluid flow in said circuit whereby to control the rate at which said pump shaft may be driven as a means of controlling the rate of such unwinding.

2. A spring motor system which includes, in combination:
   a. a spiral wound spring having an outer end fixedly secured and an inner end connected to a power shaft adapted to rotate in one direction when winding said spring and in an opposite direction when driven by said spring;
   b. a power train connected to said power shaft and adapted to rotate said power shaft in one direction and thereby wind said spring and to be driven by unwinding of said spring when said power shaft rotates in an opposite direction;
   c. a fluid pump having a pump shaft, piping connected in a closed loop therewith and a valve arranged to control the rate of fluid flow in the loop, said pump shaft being adapted to be driven by said power train during unwinding of said spring whereby said valve may control said rate of flow and thereby control the rate at which said pump shaft is driven to control the rate of said unwinding; and
   d. means to open and close said fluid control means whereby to control the rate of energy release from said spring.

3. A system as claimed in claim 2 including means to remotely control said valve.

* * * * *